(12) United States Patent
Bassi et al.

(10) Patent No.: US 10,901,309 B2
(45) Date of Patent: Jan. 26, 2021

(54) SYSTEM AND METHOD FOR AUTOMATED TEST-PATTERN-FREE PROJECTION CALIBRATION

(71) Applicant: GEO SEMICONDUCTOR INC., San Jose, CA (US)

(72) Inventors: Zorawar S. Bassi, Markham (CA); Thushyanthan Jegatheswaran, Scarborough (CA)

(73) Assignee: GEO SEMICONDUCTOR INC., San Jose, CA (US)

( * ) Notice: Subject to any disclaimer, the term of this patent is extended or adjusted under 35 U.S.C. 154(b) by 388 days.

(21) Appl. No.: 15/870,120

(22) Filed: Jan. 12, 2018

(65) Prior Publication Data

US 2018/0196336 A1    Jul. 12, 2018

Related U.S. Application Data

(63) Continuation of application No. 14/100,524, filed on Dec. 9, 2013, now Pat. No. 9,915,857.

(51) Int. Cl.

| | |
|---|---|
| *G06T 7/80* | (2017.01) |
| *G06T 3/60* | (2006.01) |
| *G03B 21/14* | (2006.01) |
| *H04N 9/31* | (2006.01) |

(52) U.S. Cl.
CPC .............. *G03B 21/147* (2013.01); *G06T 3/60* (2013.01); *G06T 7/80* (2017.01); *H04N 9/3185* (2013.01); *H04N 9/3194* (2013.01)

(58) Field of Classification Search
CPC .... G01T 1/663; G03B 21/147; G03B 21/142; G06T 3/60; G06T 7/80
See application file for complete search history.

(56) References Cited

U.S. PATENT DOCUMENTS

| | | | | |
|---|---|---|---|---|
| 5,901,252 A | * | 5/1999 | Kawakami | G06K 9/4619 345/648 |
| 5,933,544 A | * | 8/1999 | Brown | G09F 19/12 345/419 |
| 5,999,660 A | * | 12/1999 | Zorin | G06T 3/0062 382/154 |
| 6,005,611 A | * | 12/1999 | Gullichsen | G06T 3/0018 348/143 |
| 6,046,745 A | * | 4/2000 | Moriya | G06T 7/70 345/420 |
| 6,101,288 A | * | 8/2000 | Kang | G06T 5/006 382/275 |

(Continued)

*Primary Examiner* — David P Porta
*Assistant Examiner* — Djura Malevic
(74) *Attorney, Agent, or Firm* — Sughrue Mion, PLLC

(57) ABSTRACT

Systems and methods for calibrating an image projection system, using image capture devices are disclosed. In particular, Wide-Angle (WA) and Ultra Wide-Angle (UWA) lenses can be utilized to eliminate need for traditional test patterns and tedious alignment settings. That is particularly useful for automatic calibration of projection sources that may require frequent adjustments on the field. Geometric mapping techniques combined with image analytics allow identifying parallel lines in an image captured from a scene. Coordinates of vanishing points corresponding to pairs of parallel lines provide sufficient information to determine orientation of the image projection system in space.

20 Claims, 10 Drawing Sheets

(56) References Cited

U.S. PATENT DOCUMENTS

| | | | |
|---|---|---|---|
| 6,369,814 B1 * | 4/2002 | Dorbie | G06T 5/006 345/419 |
| 6,400,848 B1 * | 6/2002 | Gallagher | G06T 5/006 382/154 |
| 6,529,206 B1 * | 3/2003 | Ohki | G06T 15/20 345/427 |
| 6,591,005 B1 * | 7/2003 | Gallagher | G06K 9/3208 382/154 |
| 6,753,907 B1 * | 6/2004 | Sukthankar | H04N 5/7408 348/190 |
| 6,947,610 B2 * | 9/2005 | Sun | G06T 3/00 353/69 |
| 7,347,564 B2 * | 3/2008 | Matsumoto | G06T 3/0006 345/647 |
| 7,907,171 B2 * | 3/2011 | Miyamoto | H04N 1/387 348/207.1 |
| 7,912,320 B1 * | 3/2011 | Minor | G01B 11/02 382/286 |
| 7,950,849 B2 * | 5/2011 | Claus | G06T 11/005 378/18 |
| 8,068,693 B2 * | 11/2011 | Sorek | H04N 1/3876 382/284 |
| RE43,490 E * | 6/2012 | Gullichsen | H04N 5/2628 348/207.99 |
| 8,272,746 B2 * | 9/2012 | Furui | H04N 9/3194 353/69 |
| 8,396,283 B2 * | 3/2013 | Iihoshi | G06K 9/00234 382/106 |
| 8,428,394 B2 * | 4/2013 | Krieter | G01S 5/163 382/106 |
| 8,525,871 B2 * | 9/2013 | Agarwala | G06T 3/0018 348/36 |
| 8,582,815 B2 * | 11/2013 | Sasaki | G06K 9/00791 382/103 |
| 8,611,694 B2 * | 12/2013 | Kogan | G06T 7/536 358/1.2 |
| 8,811,751 B1 * | 8/2014 | Ma | G06K 9/3275 382/199 |
| 8,884,979 B2 * | 11/2014 | Haraguchi | H04N 9/3194 345/585 |
| 8,913,836 B1 * | 12/2014 | Ma | G06K 9/3283 382/199 |
| 8,923,650 B2 * | 12/2014 | Wexler | H04N 5/217 382/286 |
| 9,008,460 B2 * | 4/2015 | Shechtman | G06T 5/00 382/289 |
| 9,122,138 B2 * | 9/2015 | Furui | G03B 21/147 |
| 9,189,836 B2 * | 11/2015 | Furui | G09G 3/002 |
| 9,294,671 B2 * | 3/2016 | Woodman | G06T 3/4069 |
| 2005/0069195 A1 * | 3/2005 | Uezono | G01C 11/06 382/154 |
| 2007/0025723 A1 * | 2/2007 | Baudisch | G03B 13/02 396/287 |
| 2007/0041058 A1 * | 2/2007 | Disatnik | G06F 3/0317 358/486 |
| 2007/0081081 A1 * | 4/2007 | Cheng | H04N 5/772 348/218.1 |
| 2007/0280554 A1 * | 12/2007 | Chernichenko | G06T 5/006 382/275 |
| 2008/0062164 A1 | 3/2008 | Bassi et al. | |
| 2008/0239107 A1 * | 10/2008 | Cho | H04N 5/217 348/241 |
| 2009/0022422 A1 * | 1/2009 | Sorek | H04N 5/23238 382/284 |
| 2009/0096790 A1 * | 4/2009 | Wiedemann | G06K 9/00201 345/427 |
| 2010/0033551 A1 * | 2/2010 | Agarwala | G06T 3/0018 348/36 |
| 2010/0045942 A1 * | 2/2010 | Furui | H04N 9/3185 353/69 |
| 2010/0053569 A1 * | 3/2010 | Furui | H04N 9/3185 353/70 |
| 2010/0061601 A1 * | 3/2010 | Abramoff | G06K 9/00617 382/117 |
| 2010/0085581 A1 | 4/2010 | Barbier et al. | |
| 2010/0309390 A1 * | 12/2010 | Plut | H04N 9/3147 348/744 |
| 2011/0187844 A1 * | 8/2011 | Ogawa | B60R 1/00 348/78 |
| 2012/0092341 A1 * | 4/2012 | Oxaal | G03B 37/02 345/420 |
| 2012/0321216 A1 * | 12/2012 | Kacher | G06K 9/3283 382/275 |
| 2013/0094764 A1 * | 4/2013 | Campbell | G06K 9/32 382/199 |
| 2013/0286221 A1 * | 10/2013 | Shechtman | G06T 5/00 348/187 |
| 2013/0287318 A1 * | 10/2013 | Shechtman | G06T 5/00 382/289 |
| 2014/0043473 A1 * | 2/2014 | Gupta | H04N 17/00 348/135 |

\* cited by examiner

Rotation about z axis

Vertical Keystone

Horizontal Keystone combinatory distortion

SYSTEM AND METHOD FOR AUTOMATED TEST-PATTERN-FREE PROJECTION CALIBRATION

FIELD OF INVENTION

The embodiments described herein relate generally to electronic image and video processing, and specifically to calibration of image projection systems.

BACKGROUND

Image projection systems are known to be highly susceptible to geometric image distortions due to their positional freedom. Essentially, any deviation from perpendicularity of the axis that connects the light source of a projector to a viewing surface (normally the optical axis) causes a so-called keystone distortion. Although occurring in rear-projection configurations too, this effect is more pronounced in front-projection configurations that have typically a long throw ratio.

Several prior art patents address electronic correction of geometric distortions, in addition to older mechanical solutions. A majority of the electronic correction methods exploit some form of calibration test patterns that consist of precisely positioned objects (lines, circles, rectangles, etc.) on the projection surface; or use a fixed reference such as physical bezels of the projection surface. These solutions are generally suitable for calibrations in controlled environments, where devices are stationary or have limited displacements. Also, they may require precise alignment jobs. The U.S. Pat. No. 8,406,562 teaches a comprehensive test pattern and reference based calibration techniques applicable to most image systems including rear and front view projectors, and various surface geometries. Another class of calibration methods, for example as taught in the U.S. Pat. No. 6,877,863; relies on position and orientation measurement sensors to quantify distortion parameters. That in turn requires extra components and tools.

In some set-ups, such as a car Heads-Up-Display (HUD) or a Helmet-Mounted-Display (HMD), the projectors are susceptible to constant displacements from the ideal (also referred to as reference) position. Yet, it is crucial to have an undistorted image at all time. Therefore, there is a need for fast, frequent, and automatic calibration on the run. Further, it would be desirable to eliminate additional resources (test patterns, test pattern generators) and alignment tasks needed to perform the calibration.

The present invention takes advantage of digital imaging combined with image analytic techniques to extract projectors' rotational angles from naturally occurring scenes, instead of calibration patterns. Capture devices equipped with Wide-Angle (WA) and particularly Ultra Wide-Angle (UWA) lenses, lenses having a field of view of at least 180°, almost guarantee capture of useful information from a scene. This approach would be at the expense of complexity of UWA mapping calculations and performing heavier image processing. The co-pending patent application PCTUS2012/027189 teaches techniques of UWA lens mapping; content of which will be used as a reference.

SUMMARY

The embodiments described herein provide in one aspect, test-pattern-free method to calibrate an image projector for rotational movements of the projector with respect to a reference frame having three perpendicular x, y, and z axes, wherein x and z axes are on a horizontal plane and z axis is along optical axis of the image projector, said method comprising: capturing at least one image of a scene by an Ultra Wide-Angle (UWA) lens camera that is attached to the image projector; and configuring at least one processing unit to: identify at least two parallel lines from a plurality of horizontal structures along the x axis in the at least one image of the scene; obtain coordinates of a vanishing point corresponding to the at least two parallel lines, in the UWA lens space using UWA lens mapping transformation; obtain rotational angle of the image projector with respect to the x axis from the coordinates of the vanishing point; and construct and apply a correction transformation using the obtained rotational angle to compensate for horizontal pan of the image projector.

The test-pattern-free method to calibrate an image projector for rotational movements of the projector with respect to a reference frame having three perpendicular x, y, and z axes, wherein x and z axes are on a horizontal plane and z axis is along optical axis of the image projector, said method comprising: capturing at least one image of a scene by an Ultra Wide-Angle (UWA) lens camera that is attached to the image projector; and configuring at least one processing unit to: identify at least two parallel lines from a plurality of vertical structures along the y axis in the at least one image of the scene; obtain coordinates of a vanishing point corresponding to the at least two parallel lines, in the UWA lens space using UWA lens mapping transformation; obtain rotational angle of the image projector with respect to the y axis from the coordinates of the vanishing point; construct and apply a correction transformation using the obtained rotational angle to compensate for vertical pan of the image projector.

The embodiments described herein provide in another aspect an electronic processor that is configured to calibrate an image projector for rotational movements of the projector with respect to a reference frame without using a test pattern, the reference frame having three perpendicular x, y, and z axes, wherein x and z axes are on a horizontal plane and z axis is along optical axis of the image projector, said processor comprising: means to acquire at least one image of a scene captured by an Ultra Wide-Angle (UWA) lens camera that is attached to the image projector; means to identify at least two parallel lines from a plurality of horizontal structures along the x axis in the at least one image of the scene; means to obtain coordinates of a first vanishing point corresponding to the at least two parallel lines from the plurality of horizontal structures, in the UWA lens space using UWA lens mapping transformation; means to obtain rotational angle of the image projector with respect to the x axis from the coordinates of the first vanishing point; means to construct a correction transformation comprising the obtained rotational angle with respect to the x axis; and means to apply the correction transformation to compensate for horizontal pan of the image projector.

BRIEF DESCRIPTION OF THE DRAWINGS

For a better understanding of the embodiments and/or related implementations described herein and to show more clearly how they may be carried into effect, reference will now be made, by way of example only, to the accompanying drawings which show at least one exemplary embodiment and/or related implementation in which.

Figure 1:
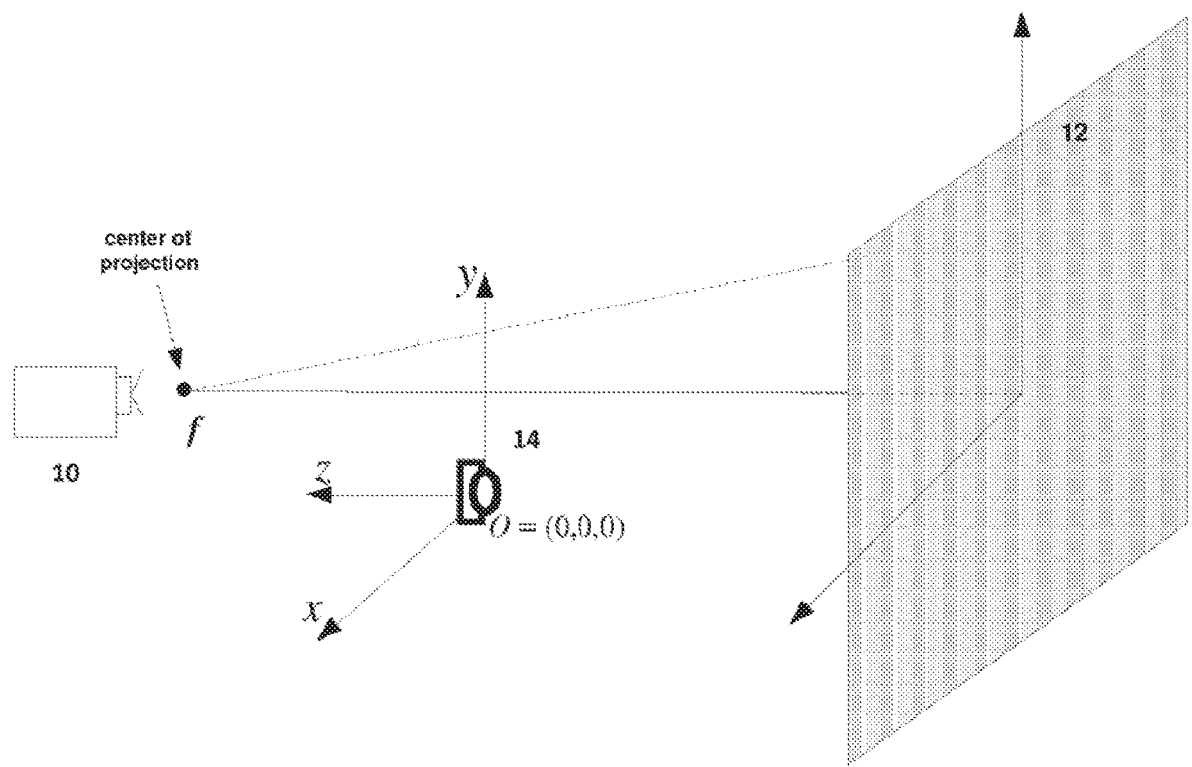
FIG. 1 illustrates an exemplary embodied set-up, comprising a projector, a camera and a viewing surface. The convention for a coordinate system is also shown.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein.

However, it will be understood by those of ordinary skill in the art that the embodiments and/or implementations described herein may be practiced without these specific details. In other instances, well-known methods, procedures and components have not been described in detail so as not to obscure the embodiments and/or implementations described herein.

Furthermore, this description is not to be considered as limiting the scope of the embodiments described herein, but rather to describe the structure and operation of the various embodiments and/or implementations described herein.

FIG. 1 illustrates an image projection source 10 positioned in front of a viewing surface 12. A capture device 14 is also placed in front of the viewing surface. Although a camera is merely one exemplary capture device, the terms capture device and camera will be used interchangeably hereinafter. The image projection source 10 is generally referred to any module that produces an image in the form of an envelope of light rays on a surface; regardless of size, source of light and other structural characteristics of the device. It can be part of a front as well as a rear projection configuration. Furthermore, it should be noted that the viewing surface 12 can be virtual as well as real. For instance, in car HUD applications, the image is formed on a virtual 2D screen viewable by the driver or passengers in the car. A virtual image cannot be formed on a real screen. Furthermore, the viewing surface 12 can be curved, in which case the curvature and other geometric characteristics must be accounted for.

FIG. 1 also shows a 3D reference frame associated with the calibration system. xz is a horizontal plane and +y defines up in the vertical direction. The optical axis of the camera is taken along the z-axis with the camera 14 looking along the negative z-axis, as shown. If more than one camera exists, e.g. a configuration of N arbitrarily placed cameras, each camera will be identified by a label n=1, . . . , N; and has associated with it a 3D right-handed coordinate frame, referred to as Frame-n, with the camera at the origin (0, 0, 0) of that frame. All real world points in Frame-n are labeled by a last subscript of n, for example $(x_n, y_n, z_n)$; if more than one point are being discussed then the last subscripts are mn, where m identifies the specific point in Frame-n, for example $(x_{mn}, y_{mn}, z_{mn})$. Letters (x,y,z), or vector $\vec{x}$, are used to refer to frame or real world coordinates. When no frame of reference is provided, the absolute coordinates relative to some absolute frame, are implied. The same notation will be applied to multiple positions of a single camera, in particular when a camera is displaced and/or rotated with respect to a reference position. Furthermore, the letters (u,v) are reserved for image coordinates in the 2D camera space, and the same use of subscripts is made. The image origin is taken to be the center of the image, which may not coincide with the optical axis, with the +u-axis to the left and the +v-axis to the top. Spherical and polar coordinates associated with the frame (3D) and image (2D) being $(r, \theta, \phi)$ and $(r', \phi')$ respectively.

Figure 2A:
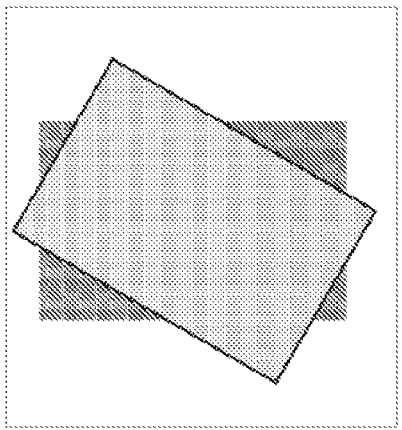
FIGS. 2A-2C illustrate geometric distortions resulting from rotation of the projection source about one of the three coordinate axis and FIG. 2D illustrates an arbitrary rotation.
Figure 2B:
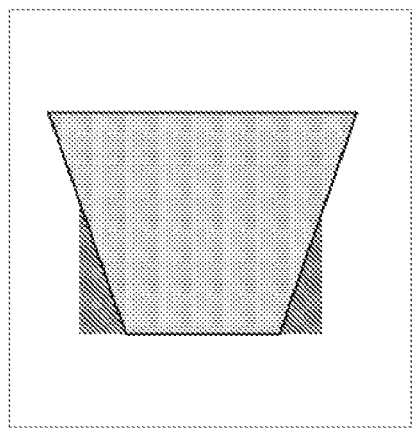
Figure 2C:
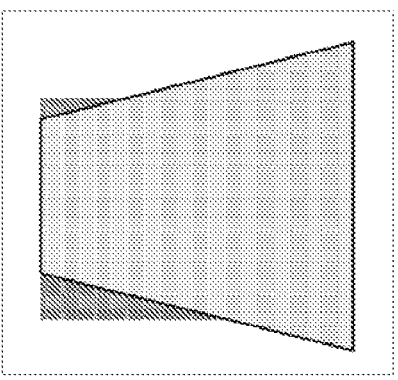
Figure 2D:
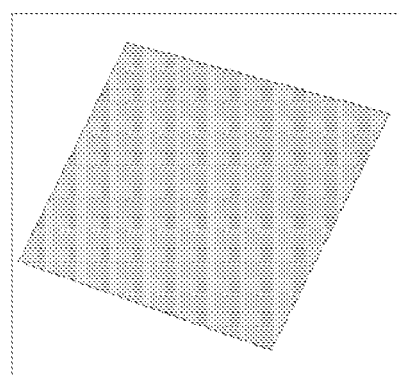

In an ideal configuration, the optical axis of the projector 10 is set to be perpendicular to the viewing surface 12 such that the projected image is formed within a rectangular boundary, referred to as the undistorted image. Any deviation from this perpendicularity, in addition to a rotation about the optical axis, results in a geometric image distortion. FIGS. 2A-2D illustrate four types of image distortions corresponding to three independent degrees of rotational freedom of the projector, formed on a flat surface. FIG. 2A illustrates a pure rotation about z axis, where the rectangular boundary is preserved but the entire image appears rotated. FIGS. 2B and 2C respectively illustrate a vertical and horizontal pan resulting in a vertical and horizontal keystone distortion of the image. An exemplary combination of all three is illustrated in FIG. 2D. Such a transform is mathematically equivalent to a rotation about an arbitrary axis in 3D that can also be represented by a rotation matrix. According to this interpretation, FIGS. 2A-2C are special cases where the axis of rotation coincides with one of the coordinate axes. In what follows, there is no distinction between what is traditionally known in the art as keystone and rotation. Computing the rotation angles (or rotation matrix) of a projector relative to its ideal distortion-free orientation would be the main objective of calibration in this general framework.

According to one embodiment of the invention, at least one capture device 14 is an essential component of a calibration system that is employed to determine the orientation of the image projection source with respect to an ideal orientation. That is, provided the orientation of the capture device relative to the projection source is known. In one embodiment, the capture device is physically attached to the projector. In another embodiment, the capture device 14 is integrated with the projection assembly, such that the orientation of the capture device never changes with respect to the projection source and no additional set-up would be required. Yet in general, the capture device is an independent unit, such as a DSLR camera. In that case, the capture device 14 can be freely positioned, as long as its relative position and orientation with respect to the projection source 12 is known. The relative position and orientation is preferably represented as a matrix to be used in computations.

Since no specific calibration test pattern is intended to be used, unlike traditional calibration methods, one needs to collect useful information from a series of objects in naturally occurring scenes, in order to determine the orientation of the camera. According to one embodiment, a set of parallel lines and vanishing points associated with the parallel lines are used to calculate the rotation matrix. That is based on an observation that it would be relatively straightforward to detect and extract parallel lines, such as horizontal or vertical lines, from recognizable objects in a scene. If a projector is placed indoor, edge lines of the walls, ceiling and floor inside a room; tables, desks, light fixtures, and computer monitors, among other objects, would be good candidates. For outdoor usage, e.g. in a car HUD assembly, building walls, windows, door frames, street lights, traffic signs, road lines, and etc. can be detected and identified for this purpose. Albeit, one needs to make a valid assumption about orientation of the detected objects. For instance, it would be safe to assume that most buildings are vertically erected, or road markings defining a parking spot are drawn in parallel.

Although it may be more likely to identify and pick horizontal and vertical lines in a scene, this is not a requirement. Any two pairs of parallel lines, where the two pairs are orthogonal in the 3D space, can be utilized to do the task as long as their angles with respect to the horizon are known or can be determined.

Figure 3:
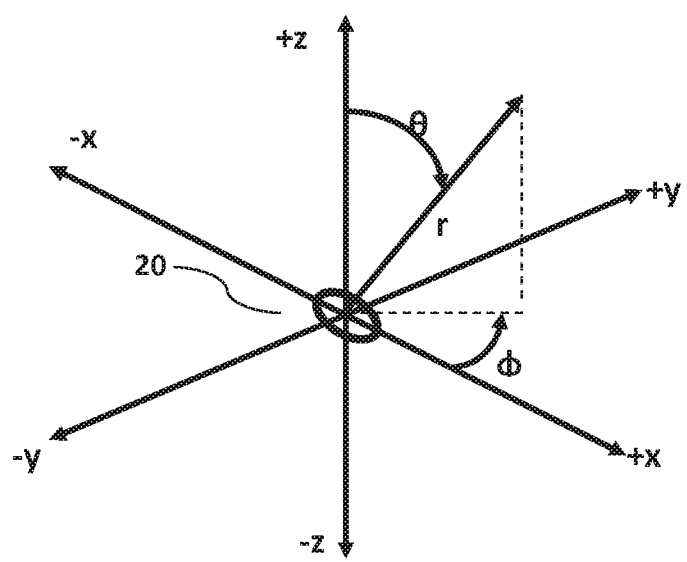
FIG. 3 illustrates orientation of a lens with respect to a spherical and a Cartesian coordinate system.

In a preferred embodiment, the capture device 14 is equipped with a lens having a large field of view (FOV) to assure enough useful information is captured from the scene in a given direction, hence avoiding repetition of the procedure. Accordingly, it would be advantageous to use wide angle (WA) and particularly ultra-wide angle (UWA) lenses to maximize the chance of inclusion of objects of interest. FIG. 3 shows a lens 20 at the center of a Cartesian coordinate system xyz. It is more natural, especially for UWA lenses (such as fisheyes), to use a spherical (polar in 2D) coordinate system. Spherical and polar coordinates associated with the frame and image will be denoted as $(r,\theta,\phi)$ and $(r',\phi')$ respectively. The lens mapping between the image and frame coordinates is generically of the form:

$$r'=F_{r'}(\theta,\phi), \phi'=F_{\phi'}(\theta,\phi)$$

$$\theta=F_\theta(r',\phi'), \phi=F_\phi(r',\phi') \quad (1)$$

In practice, the lens mapping takes (to a good approximation) a simpler one variable form:

$$r'=F_{r'}(\theta), \phi'=F_{\phi'}(\phi)$$

$$\theta=F_\theta(r'), \phi=F_\phi(\phi') \quad (2)$$

In the case of a linear (equidistant) fisheye, the above reduces to:

$$r'=f\theta, \phi'=\phi \quad (3)$$

where f is a constant that can be viewed as the focal length. Note that $\theta$ is defined as positive from the optical axis, which may not be the +z-axis of the frame, in which case the appropriate angle adjustments need to be made. Mapping for the generic case of Eq. (1) is described in the co-pending application PCTUS2012/027189, in which case the mapping should be determined a priori.

Figure 4:
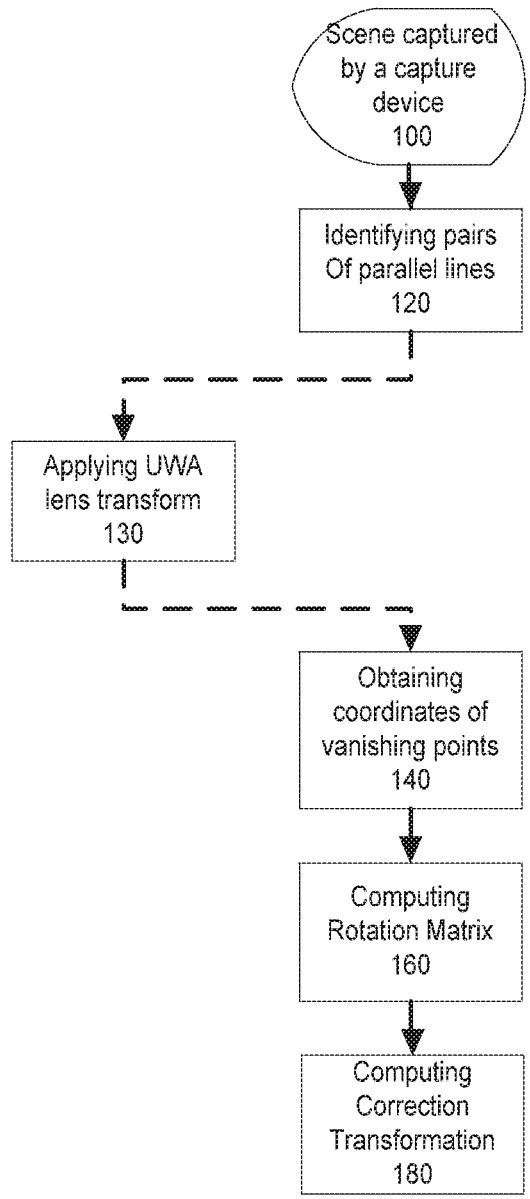
FIG. 4 illustrates steps of calibrating a projector in accordance with the embodied methods.

FIG. 4 illustrates the processing steps taken to correct for rotational image distortions, in accordance with an embodied method. At least one image capture device 14 captures an image of a scene 100. The captured image is then sent to be processed, e.g. through an electronic chip or a computer-readable medium. A number of parallel lines (at least two pairs) are then identified in the image space 120. That is accomplished by object recognition techniques practiced in the art. Depending on the viewing angle of the cameras, parallel lines in the 3D real world may appear to converge into a point known as a vanishing point. Steps 100 and 120 should be repeated if the captured scene is not satisfactory. If it is not possible to repeat step 100, namely where the projection system cannot be moved, then the processing of step 120 should be continued until the correct number of parallel lines have been identified. In one embodiment, the capture device is equipped with an UWA lens. The choice of a UWA lens significantly reduces this possibility of having a non-satisfactory scene. Because of its large FOV, it is possible to detect a sufficient number of parallel lines from objects found in most common calibration environments. Once parallel lines are identified, the spatial coordinates of the corresponding vanishing points can be calculated 140 from the equations of the lines in the image space. It will be shown that a rotation matrix can be computed 160 from the coordinates of the vanishing points. In one embodiment, where a UWA lens is used, an intermediate step may be taken to facilitate the computations. That is, the UWA lens transformation is applied to the image 130 (fisheye type) to map selected parts of the image onto a plane where the lines appear as straight rather than curvilinear. Effectively, the calculations will be done in a more familiar Cartesian space rather than the UWA lens space.

Finally, a correction transformation 180 can be constructed by combining the rotation matrix of the camera with another matrix that describes orientation of the camera relative to the projection source. In one embodiment, the correction transformation is applied in a forward direction to the output image. In another embodiment the inverse of the correction transformation is computed and applied to the source image so that the output appears undistorted. The latter is preferred, for example when the transformation is applied via a processing chip.

Figure 5A:
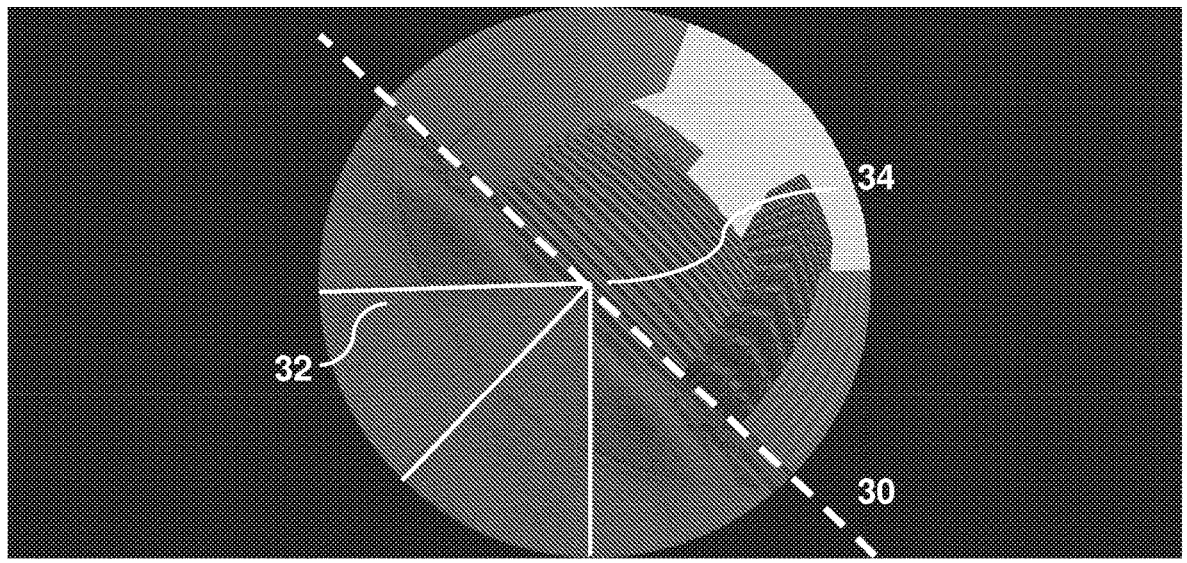
FIG. 5A illustrates an outdoor image acquired through a UWA lens as rotated about z axis with respect to the reference position (FIG. 5B)
Figure 5B:
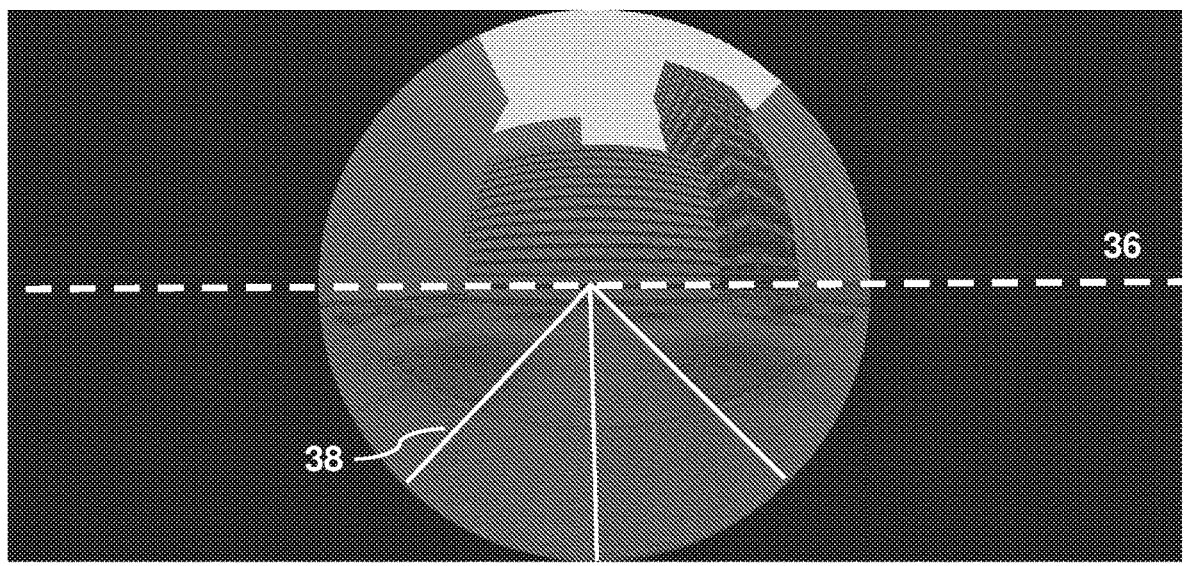

Referring to FIGS. 5A and 5B, we now provide examples in accordance with the embodiments of the invention. FIGS. 5A and 5B show a schematic outdoor image of a city view as if captured through an 180° UWA lens. The objective is to determine a mapping between two images, one as shown in FIG. 5A distorted with respect to the reference image of FIG. 5B. In one embodiment, this is accomplished by using vanishing points of parallel lines. The street and building features in FIG. 5A are quite typical. For example, the building in the middle of the image consists of distinguishable horizontal floors, supposedly parallel to the x axis but appearing rotated. Line 30 which is in x direction, indicates this rotation. Street lines 32 are also parallel lines on a horizontal plane, but to the z axis. Lines 32 appear to merge into a vanishing point 34, in this case in the middle of the image. Other parallel lines orthogonal to 32 in x and y directions do not intersect each other in the image space, i.e. the corresponding vanishing points are at infinity. Therefore, one concludes this is a pure rotation about the z axis that can be corrected to achieve an undistorted FIG. 5B where line 36 is horizontal. In this simplified example, the correction angle is essentially the angle between lines 30 and 36. Street lines 38 maintain their vanishing point in the middle of the image.

Figure 6A:
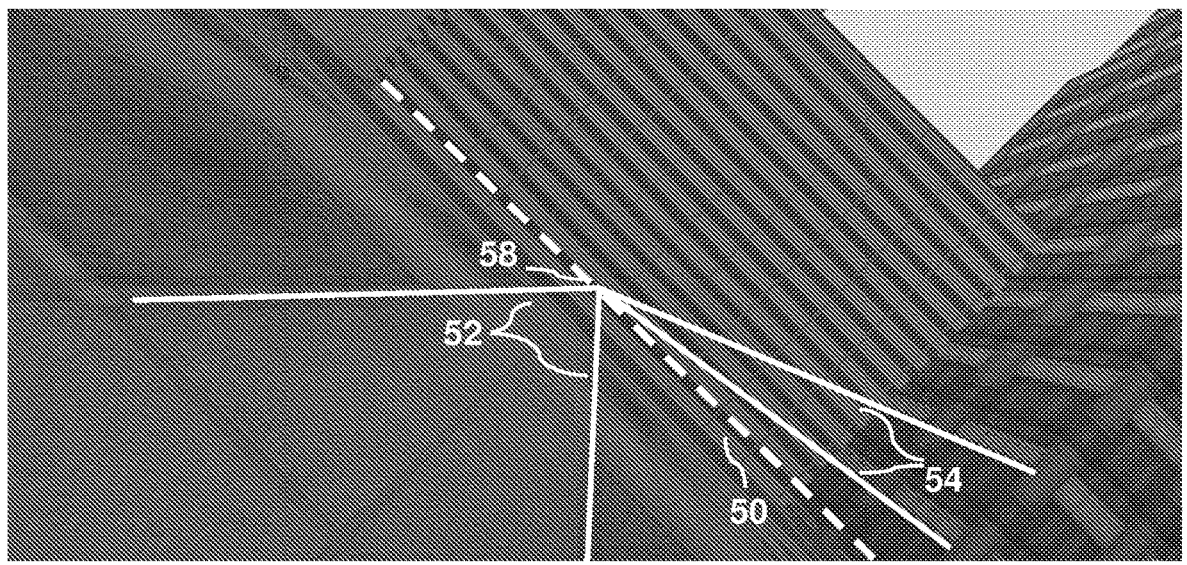
FIGS. 6A and 6B respectively illustrate mapping of a selected portion of FIGS. 5A and 5B to a projective plane.
Figure 6B:
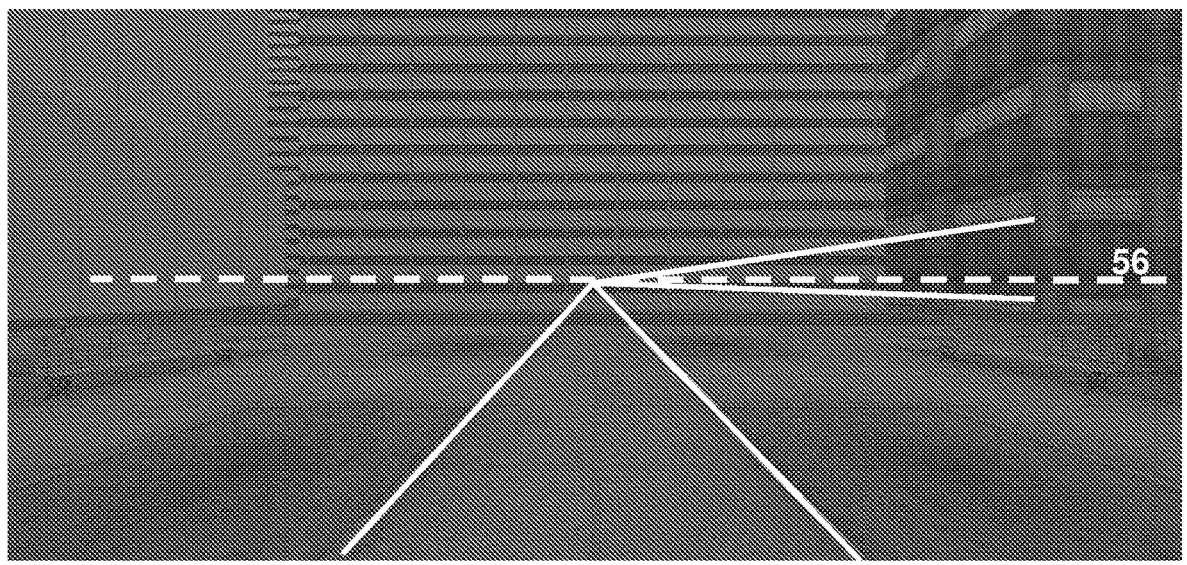

Alternatively, according to another embodiment, an intermediate step 130 can be performed. As illustrated in FIG. 6A, a portion of the image in FIG. 5A is selected and mapped to a projective plane. That can be achieved by applying the given UWA lens transformation so that the lines appear straight. A UWA transformation preserves the general orientation of objects in an image. Line 50 has the same angular rotation with respect to the horizon (56 in FIG. 6B) as the original fisheye image in FIGS. 5A and 5B. In other words, mapping from FIG. 6A and FIG. 6B obeys the same rotational transformation as FIG. 5A and FIG. 5B. Two sets of parallel lines 52 and 54 are selected that are orthogonal to each other. The former is on a plane parallel to the xz plane and the latter on a plane parallel to the yz plane. Both pairs of lines are parallel to the z axis, and all meet in a single vanishing point 58. The fact that other horizontal and vertical lines orthogonal to 52, along x or y axis, do not intersect in the image space means their vanishing points are at infinity, indicating no rotation about x and y axes.

Figure 7A:
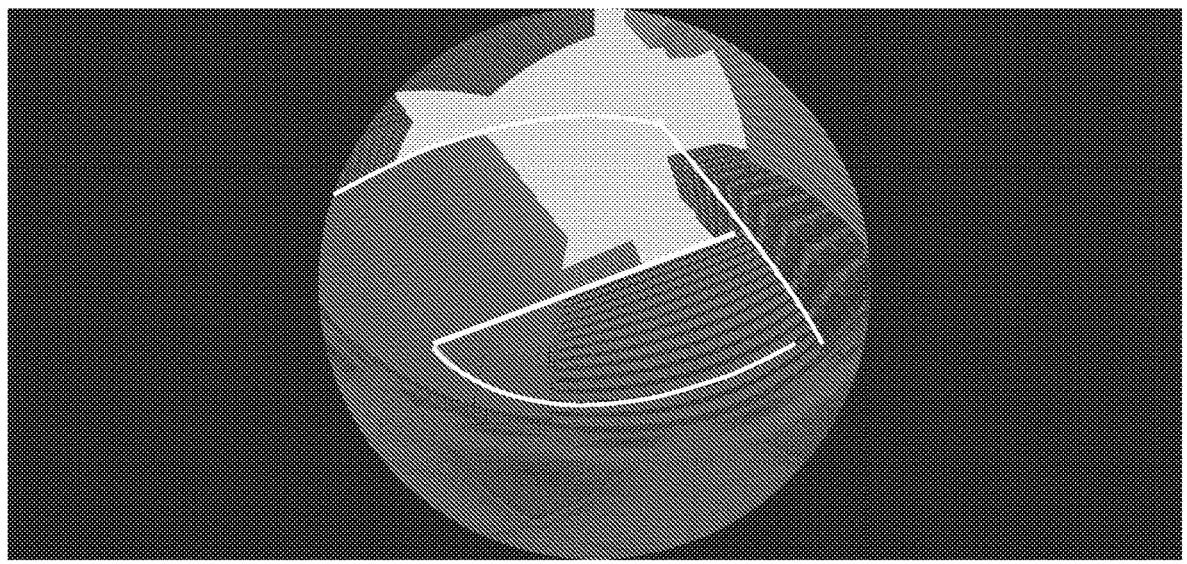
FIG. 7A illustrates an outdoor image acquired through a UWA lens as rotated about an arbitrary axis with respect to the reference position in FIG. 5B.
Figure 7B:
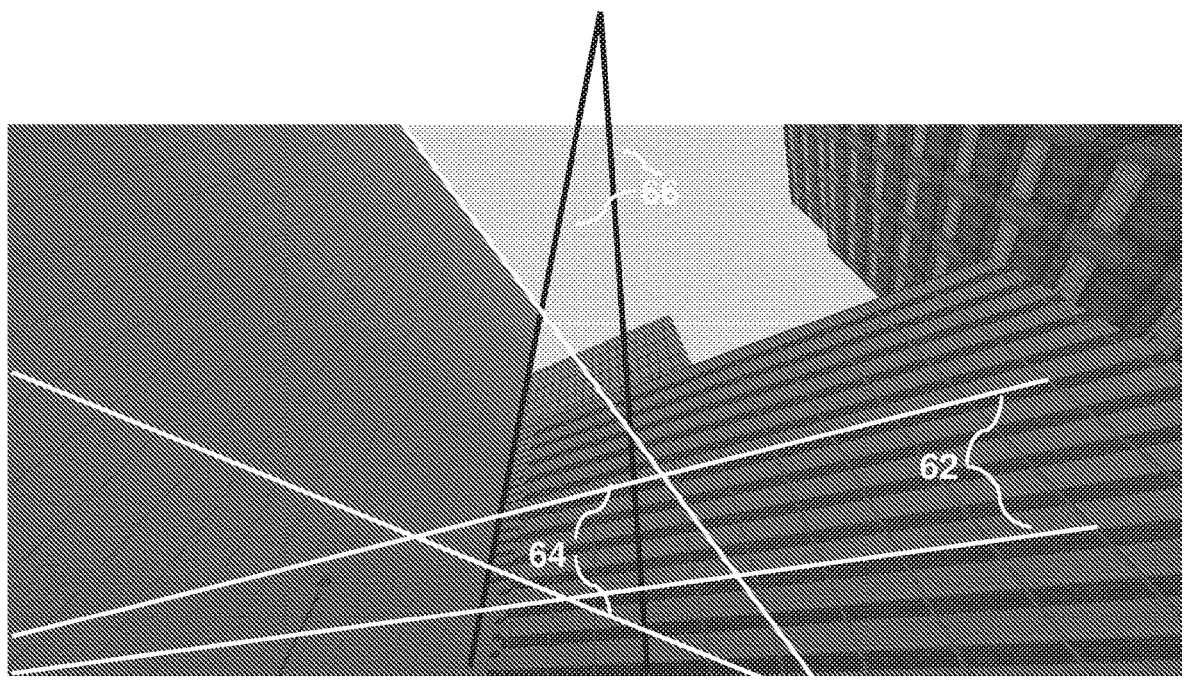
FIG. 7B illustrates mapping of a selected portion of FIG. 7A to a projective plane.

In another example, FIGS. 7A and 7B illustrate an image captured from the same scene as in FIGS. 5A and 5B while the camera view is changed. Two sets of parallel lines, one set horizontal and one set vertical, are identified in FIG. 7A and extrapolated to the corresponding vanishing points. To get around calculations in the fisheye image space in this case, it would be preferred to map a portion of the image, in accordance with the intermediate step 130, to a projective plane as shown in FIG. 7B. Two sets of parallel lines, 62 and 64 are drawn, each set extrapolated to intersect at a corresponding vanishing point (That of 62 falls outside the page and not shown). Any other line parallel to either of 62 or 64 will appear as merging into the same corresponding vanishing points. Also shown, is a third pair of supposedly vertical lines 66, orthogonal to both 92 and 94, extrapolated to a third vanishing point. This geometry suggests a vertical keystone or rotation of about x axis in the image.

Figure 8A:
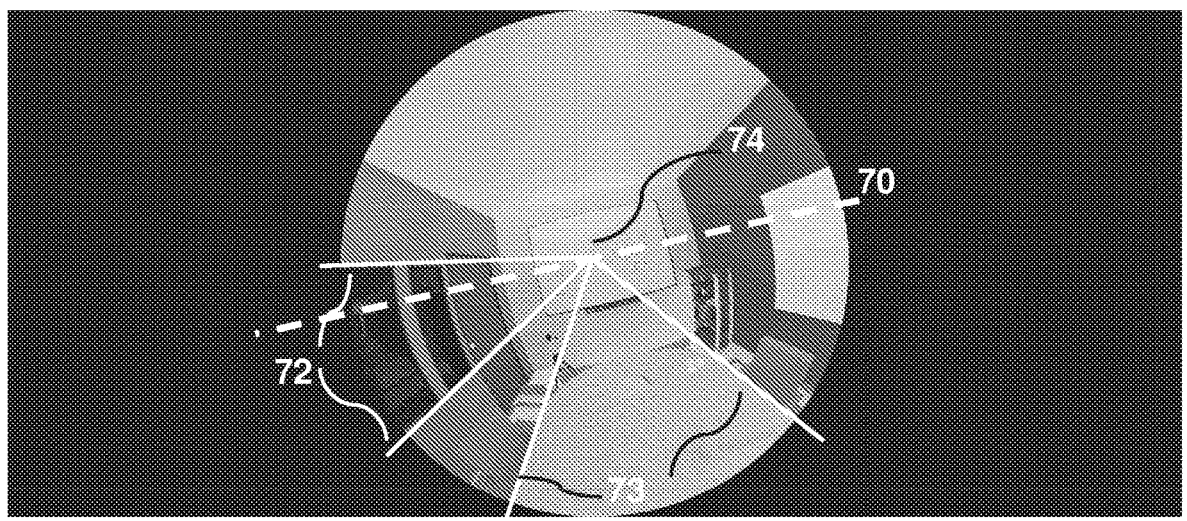
FIG. 8A illustrates an indoor image acquired through a UWA lens as rotated about z axis with respect to the reference position in (FIG. 8B)
Figure 8B:
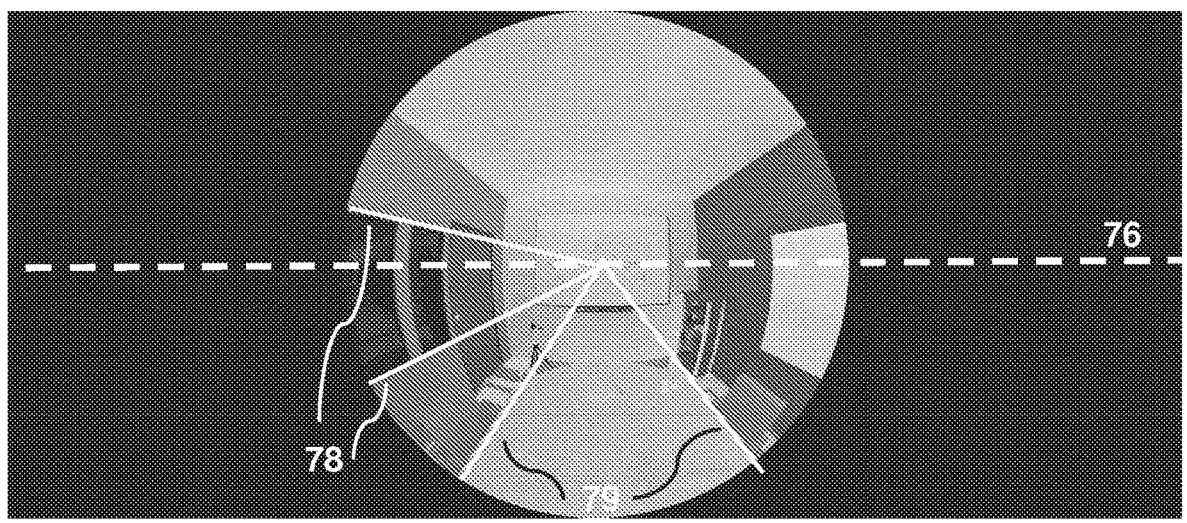

According to one embodiment, the calibration is performed indoors, e.g. inside a room or a lab environment. FIGS. 8A and 8B show a schematic image of a meeting room as if captured through an 180° UWA lens. The objective is to determine a mapping between two images, one as shown in FIG. 8A distorted with respect to the reference image of FIG. 8B. Again, this is accomplished by using vanishing points of parallel lines. The walls, ceiling, windows/door frames provide reliable parallel lines along the coordinate axes. FIG. 8A appears rotated; line 70 indicates this rotation. Window frames 72 are parallel to the z axis on a vertical plane, so are table lines 73 but on a horizontal plane. Lines 72 and 73 appear to merge into the same vanishing point 74, in this case in the middle of the image. Parallel lines orthogonal to 32 would not intersect each other in the image, i.e. the corresponding vanishing points are at infinity. Therefore, one concludes this is a pure rotation about the z axis that can be corrected to achieve an undistorted FIG. 8B where line 76 is horizontal. In this simplified example, the correction angle is essentially the angle between lines 70 and 76. Lines 78 and 79 maintain their vanishing point in the middle of the image.

Figure 9A:
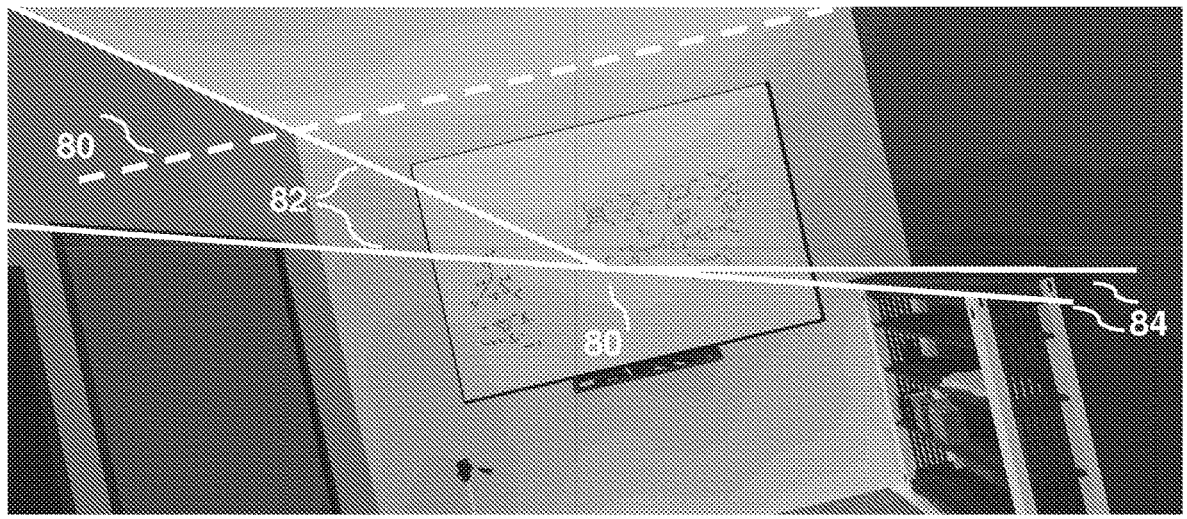
FIGS. 9A and 9B respectively illustrate mapping of a selected portion of FIGS. 8A and 8B to a projective plane.
Figure 9B:
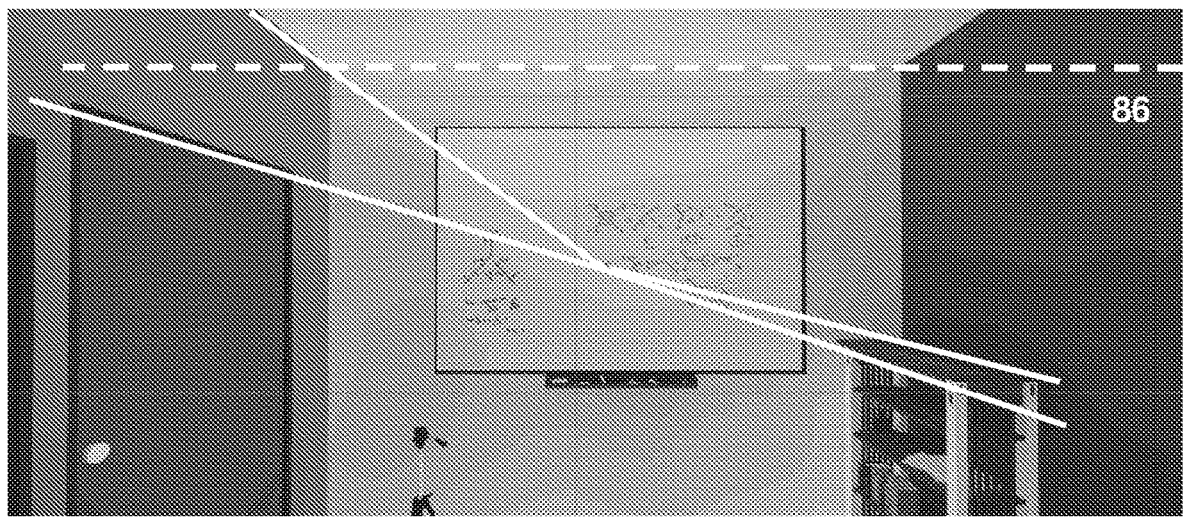

Alternatively, according to another embodiment, the intermediate step 130 can be performed to avoid dealing with curvilinear lines in a fisheye image. As illustrated in FIG. 9A, a portion of the image in FIG. 8A is selected and mapped to a projective plane. That can be achieved by applying the given UWA lens transformation so that the lines appear straight. Line 80 has the same angular rotation with respect to the horizon (86 in FIG. 9B) as the original fisheye image in FIGS. 8A and 8B. In other words, mapping from FIG. 9A and FIG. 9B obeys the same transformation as FIG. 8A and FIG. 8B. Two sets of parallel lines 82 and 84 are selected from two different planes parallel to the yz and xz planes respectively. Both pairs are parallel to the z axis and meet at the same vanishing 80 point in the middle of the image. The fact that other parallel lines along x and y axis and orthogonal to 82 do not intersect in the image space, means their vanishing points are at infinity, indicating no rotation about x and y axes.

Figure 10A:
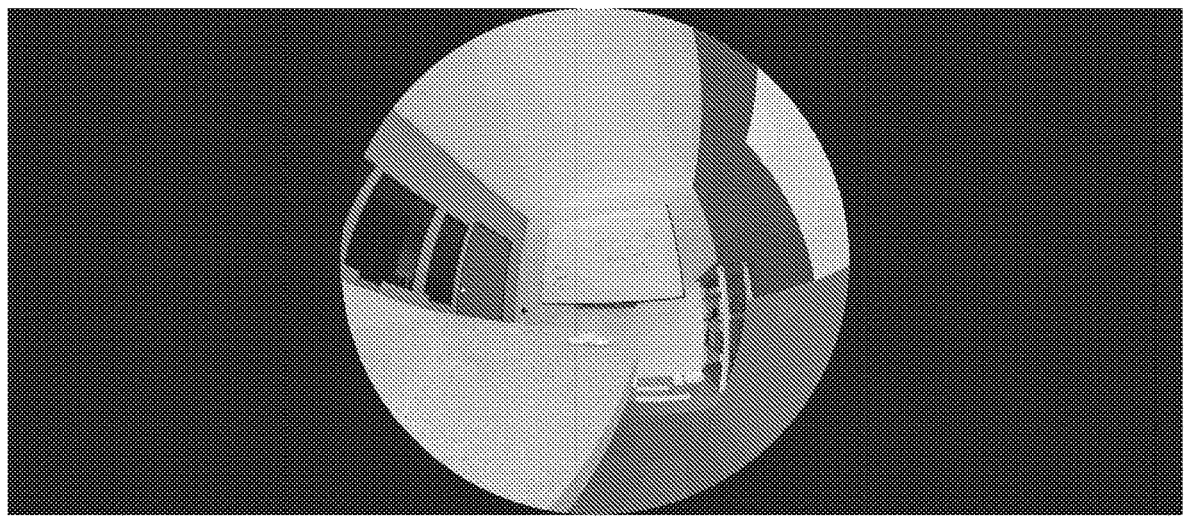
FIG. 10A illustrates an indoor image acquired through a UWA lens as rotated about an arbitrary axis with respect to the reference position in FIG. 5B.
Figure 10B:
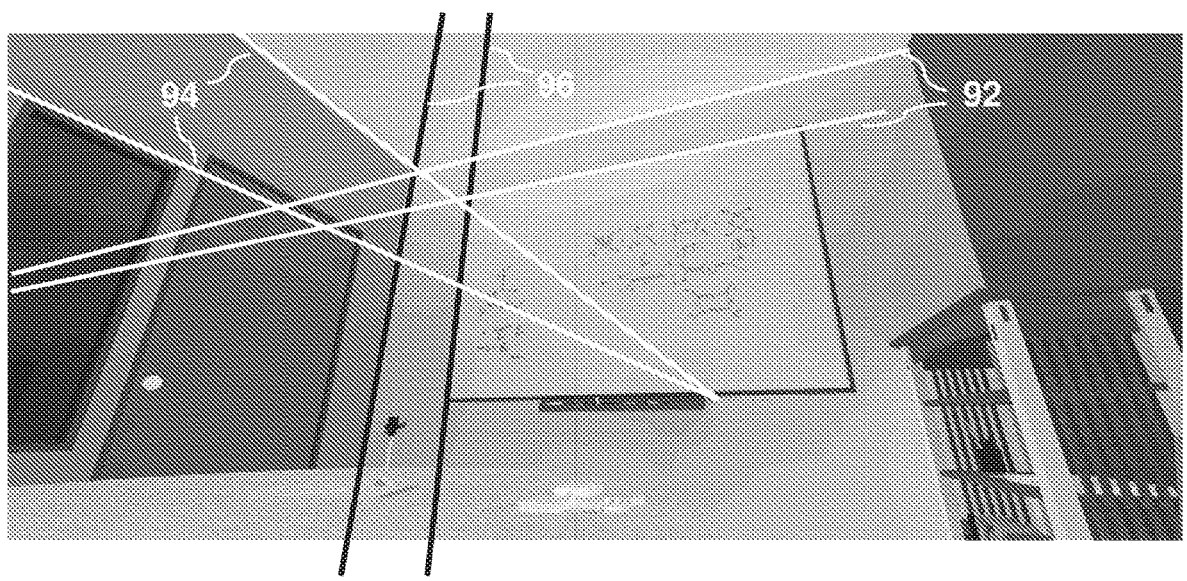
FIG. 10B illustrates mapping of a selected portion of FIG. 10A to a projective plane.

FIG. 10A illustrates an image captured from the same room as in FIGS. 8A and 8B while the camera view is changed. It would be preferred in this case to map a portion of the image, in accordance with the intermediate step 130, to a projective plane as shown in FIG. 10B. Two sets of parallel lines 92 and 94, orthogonal to each other, are drawn. Each set is extrapolated to intersect at a corresponding vanishing point (That of 92 falls outside the page and not shown). Any other line parallel to either of 92 or 94 would appear as merging into the same corresponding vanishing points. Also shown, is a third pair of supposedly vertical lines 96, orthogonal to both 92 and 94, extrapolated to a third vanishing point (out of the page). This geometry suggests a rotation about x and/or y axes. As will be shown next, identifying any two vanishing points corresponding to two sets of parallel lines, the two sets being orthogonal to each other, would be adequate to calculate the rotation matrix associated with the capture device.

We now provide algebraic calculations that enable implementation of the embodiments in a hardware processor or for a computer-readable medium. It is worth observing that FIGS. 6A, 6B, 7B, 9A, 9B, and 10B simulate what a projective camera (having a normal lens) would capture. As mentioned, rotational disorders are independent from the type of lens used for the capture. Therefore, before dealing with complications of UWA imagery, it would be beneficial to illustrate how the rotation matrix and the vanishing points can be obtained by a projective camera. For notational purposes, a line is indicated by the superscript L. Line m in Frame n is represented by the set of points $\{(x_{mn}^{Lx}, y_{mn}^{L}, z_{mn}^{L})\}$, and as $\{(u_{mn}^{L}, v_{mn}^{L})\}$ in the corresponding 2D image. For lines parallel to the x, y and z axes, a superscript of x, y and z are added respectively, for example: $\{(x_{mn}^{Lx}, y_{mn}^{Lx}, z_{mn}^{Lx})\}$, Line m in Frame-n parallel to x-axis with:

$$-\infty < x = x_{mn}^{Lx} < +\infty, y = y_{mn}^{Lx}, z = z_{mn}^{Lx} \quad (4)$$

We use $x_{mn}^{Lx}$ instead of x, to make explicit which line is being addressed.

The image taken by a projective camera is formed in a flat image space referred to as the projective space. Consider a projective camera, with position 2 (corresponding to frame 2) rotated about an arbitrary axis relative to the ideal position 1 (corresponding to frame 1). The centers of the two positions are taken to coincide, i.e. no shift. FIGS. 6A, 6B, 7B, 9A, 9B, and 10B can be consulted again, as if taken by a projective camera. Points in the two frames are related by:

$$\vec{x}_2 = R\vec{x}_1 \quad (5)$$

$$\vec{x}_1 = \begin{bmatrix} x_1 \\ y_1 \\ z_1 \end{bmatrix}, \vec{x}_2 = \begin{bmatrix} x_2 \\ y_2 \\ z_2 \end{bmatrix}, R \equiv \begin{bmatrix} R_{xx} & R_{xy} & R_{xz} \\ R_{yx} & R_{yy} & R_{yz} \\ R_{zx} & R_{zy} & R_{yy} \end{bmatrix}$$

Applying this transform to points on a line gives:

$$x_{m2}^L = R_{xx}x_{m1}^L + R_{xy}y_{m1}^L + R_{xz}z_{m1}^L$$

$$y_{m2}^L = R_{yx}x_{m1}^L + R_{yy}y_{m1}^L + R_{yz}z_{m1}^L$$

$$z_{m2}^L = R_{zx}x_{m1}^L + R_{zy}y_{m1}^L + R_{zz}z_{m1}^L \quad (6)$$

Projecting this onto the camera image in position 2, gives the line points in Image-2:

$$u_{m2}^L = -f_P \frac{R_{xx}x_{m1}^L + R_{xy}y_{m1}^L + R_{xz}z_{m1}^L}{R_{zx}x_{m1}^L + R_{zy}y_{m1}^L + R_{zz}z_{m1}^L} \quad (7)$$

$$v_{m2}^L = -f_P \frac{R_{yx}x_{m1}^L + R_{yy}y_{m1}^L + R_{yz}z_{m1}^L}{R_{zx}x_{m1}^L + R_{zy}y_{m1}^L + R_{zz}z_{m1}^L}$$

wherein $f_P > 0$, is the focal length and the negative sign indicates the camera looking down the negative z-axis. To relate the line points with the vanishing points, one may consider lines that are parallel to the three axes, and take the infinite limit for the parallel component. This gives six equations defining the vanishing points:

$$\begin{bmatrix} u_{\infty 2}^{Lx} \\ v_{\infty 2}^{Lx} \end{bmatrix} \equiv \lim_{x_{m1}^{Lx} \to \pm\infty} \begin{bmatrix} u_{m2}^{Lx} \\ v_{m2}^{Lx} \end{bmatrix} = \begin{bmatrix} -f_P \frac{R_{xx}}{R_{zx}} \\ -f_P \frac{R_{yx}}{R_{zx}} \end{bmatrix} \quad (8)$$

$$\begin{bmatrix} u_{\infty 2}^{Ly} \\ v_{\infty 2}^{Ly} \end{bmatrix} \equiv \lim_{y_{m1}^{Ly} \to \pm\infty} \begin{bmatrix} u_{m2}^{Ly} \\ v_{m2}^{Ly} \end{bmatrix} = \begin{bmatrix} -f_P \frac{R_{xy}}{R_{zy}} \\ -f_P \frac{R_{yy}}{R_{zy}} \end{bmatrix}$$

$$\begin{bmatrix} u_{\infty 2}^{Lz} \\ v_{\infty 2}^{Lz} \end{bmatrix} \equiv \lim_{z_{m1}^{Lz} \to \pm\infty} \begin{bmatrix} u_{m2}^{Lz} \\ v_{m2}^{Lz} \end{bmatrix} = \begin{bmatrix} -f_P \frac{R_{xz}}{R_{zz}} \\ -f_P \frac{R_{yz}}{R_{zz}} \end{bmatrix}$$

The right side of (8) is independent of the line, i.e. does not depend on index m; hence any line parallel to the corresponding axis meets at the same vanishing point. This can be seen, for instance, in FIGS. 6A and 6B where all four horizontal lines selected from the image, in parallel with the z axis meet at one point. Alternatively, all lines parallel to the x, y and z axes, intersect at the vanishing points $(u_{\infty 2}^{Lx}, v_{\infty 2}^{Lx})$, $(u_{\infty 2}^{Ly}, v_{\infty 2}^{Ly})$, and $(u_{\infty 2}^{Lz}, v_{\infty 2}^{Lz})$, respectively in Image-2; these will also be referred to as the x, y and z vanishing points. It is important to note if there is no rotation or the rotation leaves some axes fixed, then the corresponding vanishing points are at infinity (e.g. x and y vanishing points in FIG. 6B).

The vanishing points can also be computed directly from Image-2 by looking at the images of a pair of parallel lines. Two distinct lines parallel to the x-axis will intersect at the x vanishing point $(u_{\infty 2}^{Lx}, v_{\infty 2}^{Lx})$ in Image-2. Taking a pair of points on each line (as seen in Image-2), constructing a line through the pair and computing the intersection of the two constructed lines, gives the x vanishing point coordinates; similarly the y and z vanishing points can be computed. Again, if some of the axes remains fixed, the corresponding parallel lines will continue to remain parallel in Image-2 and the intersection is at infinity; these cases need to be individually handled. Knowing the vanishing points, the above equations can be re-written as (dropping the L superscript and 2 subscript):

$$R_{zx} = \frac{-f_P}{u_\infty^x} R_{xx}, \; R_{yx} = \frac{v_\infty^x}{-f_P} R_{zx} = \frac{v_\infty^x}{u_\infty^x} R_{xx} \quad (9)$$

$$R_{zy} = \frac{-f_P}{v_\infty^y} R_{yy}, \; R_{xy} = \frac{u_\infty^y}{-f_P} R_{zy} = \frac{u_\infty^y}{v_\infty^y} R_{yy}$$

$$R_{xz} = \frac{u_\infty^z}{-f_P} R_{zz}, \; R_{yz} = \frac{v_\infty^z}{-f_P} R_{zz}$$

Furthermore, for a rotation there are additional constraints on the elements from the matrix being orthogonal:

$$RR^T = R^T R = 1 \quad (10)$$

Equations (9) and (10) are sufficient to determine the rotation matrix. In fact the system is over constrained. Solving the equations gives:

$$R_{xx} = \sqrt{I_{xx}^R}, \; I_{xx}^R \equiv (R_{xx})^2 = \frac{1 + \frac{v_\infty^y}{u_\infty^y} \frac{v_\infty^z}{u_\infty^z}}{\left(\frac{v_\infty^x}{u_\infty^x} - \frac{v_\infty^y}{u_\infty^y}\right)\left(\frac{v_\infty^x}{u_\infty^x} - \frac{v_\infty^z}{u_\infty^z}\right)} \quad (11)$$

$$R_{yy} = \sqrt{I_{yy}^R}, \; I_{yy}^R \equiv (R_{yy})^2 = \frac{1 + \frac{v_\infty^x}{u_\infty^x} \frac{v_\infty^z}{u_\infty^z}}{\left(\frac{v_\infty^y}{u_\infty^y} - \frac{v_\infty^x}{u_\infty^x}\right)\left(\frac{v_\infty^y}{u_\infty^y} - \frac{v_\infty^z}{u_\infty^z}\right)}$$

$$R_{zz} = \sqrt{I_{zz}^R}, \; I_{zz}^R \equiv (R_{zz})^2 = \frac{\frac{v_\infty^y}{v_\infty^x} + \frac{u_\infty^y}{u_\infty^x}}{\left(1 - \frac{u_\infty^y}{u_\infty^x}\right)\left(1 - \frac{v_\infty^z}{v_\infty^x}\right) - \left(1 - \frac{v_\infty^y}{v_\infty^x}\right)\left(1 - \frac{u_\infty^z}{u_\infty^x}\right)}$$

In the above, the positive square root has been taken based on the following representation for R. In general, a rotation matrix can be written in terms of a unit vector $\hat{\omega} = (\omega_x, \omega_y, \omega_z)$, being the axis of rotation, and an angle $\alpha$ giving the rotation angle about $\hat{\omega}$. This is known as Rodrigues' rotation formula:

$$R_{ij} = \omega_i \omega_j - \varepsilon_{ijk} \omega_k \sin\alpha + (1 - \omega_i \omega_j)\cos\alpha \quad (12)$$

i, j=1, 2, 3, with the correspondence 1↔x, 2↔y, 3↔z

The fully anti-symmetric tensor $\varepsilon_{ijk}$ is used in (13). For the diagonal elements, the parameterization becomes:

$$R_{xx} = \omega_x^2 + (1 - \omega_x^2)\cos\alpha$$

$$R_{yy} = \omega_y^2 + (1 - \omega_y^2)\cos\alpha$$

$$R_{zz} = \omega_z^2 + (1 - \omega_z^2)\cos\alpha \quad (14)$$

Since $-1 \leq \omega_i \leq 1$, for $$-\frac{\pi}{2} \leq \alpha \leq \frac{\pi}{2},$$

that is typical for most practical applications, we have the diagonal elements as being positive. The diagonal elements are independent of the focal length, which is expected since the rotation matrix cannot depend on the scale of the image. A more compact form for the diagonal elements can be written using dot and cross products of the vanishing points. Defining the following vanishing points in 3D:

$$\vec{x}_\infty \equiv \begin{bmatrix} u^x_\infty \\ v^x_\infty \\ 0 \end{bmatrix}, \vec{y}_\infty \equiv \begin{bmatrix} u^y_\infty \\ v^y_\infty \\ 0 \end{bmatrix}, \vec{z}_\infty \equiv \begin{bmatrix} u^z_\infty \\ v^z_\infty \\ 0 \end{bmatrix} \quad (15)$$

Then:

$$R_{xx} = \sqrt{(\vec{x}_\infty \cdot \hat{i})^2 \frac{(\vec{y}_\infty \cdot \vec{z}_\infty)}{(\vec{x}_\infty \times \vec{y}_\infty) \cdot (\vec{x}_\infty \times \vec{z}_\infty)}}$$

$$R_{yy} = \sqrt{(\vec{y}_\infty \cdot \hat{j})^2 \frac{(\vec{x}_\infty \cdot \vec{z}_\infty)}{(\vec{y}_\infty \times \vec{x}_\infty) \cdot (\vec{y}_\infty \times \vec{z}_\infty)}} \quad (16)$$

$$R_{zz} = \sqrt{\frac{\hat{k} \cdot (\vec{x}_\infty \times \vec{y}_\infty)}{\hat{k} \cdot [(\vec{x}_\infty \times \vec{y}_\infty) + (\vec{y}_\infty \times \vec{z}_\infty) + (\vec{z}_\infty \times \vec{x}_\infty)]}}$$

$$\hat{i} = \begin{bmatrix} 1 \\ 0 \\ 0 \end{bmatrix}, \hat{j} = \begin{bmatrix} 0 \\ 1 \\ 0 \end{bmatrix}, \hat{k} = \begin{bmatrix} 0 \\ 0 \\ 1 \end{bmatrix}$$

The elements not involving the z index can be computed from equation (9):

$$R_{xy} = \frac{u^y_\infty}{v^y_\infty} R_{yy}, R_{yx} = \frac{v^x_\infty}{u^x_\infty} R_{xx} \quad (17)$$

This also shows independence from the focal length. Instead of using equation (9) for the remaining elements, which seem to include the focal length, we compute those using additional relations from equation (10). It follows from (10) that:

$$R_{xz}^2 = 1 - R_{xx}^2 - R_{xy}^2, R_{yz}^2 = 1 - R_{yy}^2 - R_{yx}^2 \quad (18)$$

Combining with (9) to obtain the sign gives the following, focal length independent result:

$$R_{xz} = \mathrm{sign}(-u^z_\infty) \frac{\sqrt{1 - R_{xx}^2 - R_{xy}^2}}{\sqrt{1 - R_{yy}^2 - R_{yx}^2}}, R_{yz} = \mathrm{sign}(-v^z_\infty) \quad (19)$$

Similarly, it can be shown that:

$$R_{zx} = \left( \frac{R_{xy} R_{yz} - R_{yy} R_{xz}}{R_{xx} R_{yy} - R_{xy} R_{yx}} \right) R_{zz}, R_{zy} = \left( \frac{R_{yx} R_{xz} - R_{xx} R_{yz}}{R_{xx} R_{yy} - R_{xy} R_{yx}} \right) R_{zz} \quad (20)$$

This can be computed using the previously determined elements.

As mentioned above, the system of equations is over constrained. In particular this implies that it is not necessary to know all three vanishing points to compute the rotation matrix. The various constraints from (10) lead to relations that allow computation of the rotation matrix from two vanishing points. Consider the following constraint:

$$R_{xx} R_{xy} + R_{yx} R_{yy} + R_{zx} R_{zy} = 0 \quad (21)$$

Using (9) gives:

$$\frac{u^y_\infty}{v^y_\infty} R_{xx} R_{yy} + \frac{v^x_\infty}{u^x_\infty} R_{xx} R_{yy} + \frac{f_P^2}{u^x_\infty v^y_\infty} R_{xx} R_{yy} = 0, \quad (22)$$

This implies:

$$f_P^2 = -(\vec{x}_\infty \cdot \vec{y}_\infty) \text{ or } f_P = \sqrt{-(\vec{x}_\infty \cdot \vec{y}_\infty)} \quad (23)$$

The focal length is hence determined by the x and y vanishing points. This result can be used to determine the diagonal elements, and in turn all the elements, in terms of the x and y vanishing points. The diagonal elements are determined as follows:

$$R_{xx}^2 + R_{yx}^2 + R_{zx}^2 = 1 \Rightarrow R_{xx}^2 = \frac{1}{1 + \left(\frac{v^x_\infty}{u^x_\infty}\right)^2 + \left(\frac{f_P}{u^x_\infty}\right)^2} \quad (24)$$

$$\therefore R_{xx} = \sqrt{\frac{(\vec{x}_\infty \cdot \hat{i})^2}{\vec{x}_\infty \cdot (\vec{x}_\infty - \vec{y}_\infty)}}$$

$$R_{xy}^2 + R_{yy}^2 + R_{zy}^2 = 1 \Rightarrow R_{yy}^2 = \frac{1}{1 + \left(\frac{u^y_\infty}{v^y_\infty}\right)^2 + \left(\frac{f_P}{v^y_\infty}\right)^2}$$

$$\therefore R_{yy} = \sqrt{\frac{(\vec{y}_\infty \cdot \hat{j})^2}{\vec{y}_\infty \cdot (\vec{y}_\infty - \vec{x}_\infty)}}$$

$$R_{zx}^2 + R_{zy}^2 + R_{zz}^2 = 1 \Rightarrow R_{zz}^2 = 1 - \left(\frac{f_P}{u^x_\infty}\right)^2 R_{xx}^2 - \left(\frac{f_P}{v^y_\infty}\right)^2 R_{yy}^2$$

$$\therefore R_{zz} = \sqrt{1 + \frac{(\vec{x}_\infty \cdot \vec{y}_\infty)}{\vec{x}_\infty \cdot (\vec{x}_\infty - \vec{y}_\infty)} + \frac{(\vec{x}_\infty \cdot \vec{y}_\infty)}{\vec{y}_\infty \cdot (\vec{y}_\infty - \vec{x}_\infty)}}$$

From their explicit form, we see that there is no dependence on $\vec{z}_\infty$, the z vanishing point. Four of the remaining elements are given by (again independent of $\vec{z}_\infty$):

$$R_{zx} = \frac{-f_P}{u^x_\infty} R_{xx} = \frac{-\sqrt{-(\vec{x}_\infty \cdot \vec{y}_\infty)}}{u^x_\infty} R_{xx}, R_{yx} = \frac{v^x_\infty}{u^x_\infty} R_{xx} \quad (25)$$

$$R_{zy} = \frac{-f_P}{v^y_\infty} R_{yy} = \frac{-\sqrt{-(\vec{x}_\infty \cdot \vec{y}_\infty)}}{v^y_\infty} R_{yy}, R_{xy} = \frac{u^y_\infty}{v^y_\infty} R_{yy}$$

The last two elements can be computed from equations analogous to (20):

$$R_{xz} = -\left( \frac{R_{xx} R_{zx} + R_{xy} R_{zy}}{R_{zz}} \right), R_{yz} = -\left( \frac{R_{yx} R_{zx} + R_{yy} R_{zy}}{R_{zz}} \right) \quad (26)$$

Therefore, the rotation matrix is completely determined using only the x and y vanishing points. This suggests that the z vanishing point may be constrained by the x and y vanishing points. Comparing the two formulas for R, it can be shown that:

$$(\vec{x}_\infty - \vec{y}_\infty) \cdot \vec{z}_\infty = 0 \quad (27)$$

Mention should again be made of the special cases where some of the rotation matrix elements are zero because of vanishing points at infinity. This leads to "division by 0" situations in some of the equations. These cases need to be identified prior to the above analysis and the equations appropriately adjusted.

Up to this stage, it has been assumed that the two camera positions coincide at the center, differing only in orientation. In fact, a translation of the camera does not change the vanishing point analysis. To demonstrate this, consider a general translation vector $\vec{v}_s$:

$$\vec{x}_2 = R\vec{x}_1 + \vec{v}_s, \vec{v}_s = \begin{bmatrix} x_s \\ y_s \\ z_s \end{bmatrix} \quad (28)$$

Analogous to (7), the projective map becomes:

$$u_{m2}^L = -f_P \frac{R_{xx}x_{m1}^L + R_{xy}y_{m1}^L + R_{xz}z_{m1}^L + x_s}{R_{zx}x_{m1}^L + R_{zy}y_{m1}^L + R_{zz}z_{m1}^L + z_s} \quad (29)$$

$$v_{m2}^L = -f_P \frac{R_{yx}x_{m1}^L + R_{yy}y_{m1}^L + R_{yz}z_{m1}^L + y_s}{R_{zx}x_{m1}^L + R_{zy}y_{m1}^L + R_{zz}z_{m1}^L + z_s}$$

In taking the infinite limits along the three axes, equation (8) is unchanged; hence the computations that follow are also unchanged. In particular, the same equations can be used for computing the rotation matrix. However, the translation vector itself cannot be computed using this approach.

The results for projective cameras can be extended to UWA cameras, in accordance with a preferred embodiment of the invention. Unless lined in some certain directions, a straight line $\{(x_{mn}^L, y_{mn}^L, z_{mn}^L)\}$ in 3D will normally be imaged as a curved line in the UWA image space (see FIGS. 5A and 5B), also referred to as fisheye space. Parallel lines will again intersect in the UWA image, although determining the vanishing points is made difficult by the fact that the lines are now curved. In one embodiment, to get around this technicality, selected portions of the fisheye image the curved parallel lines are mapped onto a projective plane 130, as if they were taken by a corresponding projective camera having the same orientation and position as the UWA camera. In the projective plane, the lines appear straight and the vanishing points can be determined by looking for intersections of parallel lines aligned to the coordinate frame axes, precisely as for the projective camera above. The rotation matrix is the same for both the UWA camera and the corresponding projective camera. Once the vanishing points are known; the matrix can then be computed using the equations for the projective camera.

Let $\{(u_{m2}^L, v_{m2}^L)\}$ be the coordinates of a straight 3D line, as imaged by the rotated UWA camera in position 2 (e.g. FIG. 5A); appearing as a curved line. The real world 3D coordinates of the line can be described as:

$$\vec{x}_{m2}^L = \begin{bmatrix} x_{m2}^L \\ y_{m2}^L \\ z_{m2}^L \end{bmatrix} = \begin{bmatrix} r_{m2}^L \sin\theta_{m2}^L \cos\phi_{m2}^L \\ r_{m2}^L \sin\theta_{m2}^L \sin\phi_{m2}^L \\ r_{m2}^L \cos\theta_{m2}^L \end{bmatrix} \quad (30)$$

The radial coordinate is not known, whereas the angular coordinates $\{(\theta_{m2}^L, \phi_{m2}^L)\}$ can be computed from $\{(u_{m2}^L, v_{m2}^L)\}$ using the UWA lens transformation. Next, a projection onto a projective camera identified as n=2' with focal length $f_P$ is made, giving the 2D coordinates:

$$u_{m2'}^L = -f_P \frac{x_{m2}^L}{z_{m2}^L} = -f_P \frac{\sin\theta_{m2}^L \cos\phi_{m2}^L}{\cos\theta_{m2}^L} \quad (31)$$

$$v_{m2'}^L = -f_P \frac{y_{m2}^L}{z_{m2}^L} = -f_P \frac{\sin\theta_{m2}^L \sin\phi_{m2}^L}{\cos\theta_{m2}^L}$$

Selecting a specific value for $f_P$, e.g. 1, these equations can be used to compute the line coordinates $\{(u_{m2'}^L, v_{m2'}^L)\}$ in the projective camera (starting from the UWA image coordinates $\{(u_{m2}^L, v_{m2}^L)\}$), which will from a straight line. Taking pairs of lines $(m_1, m_2)$ parallel to the x, y and z axis, then their projective camera coordinates: $\{(u_{m_12'}^{Lx}, v_{m_12'}^{Lx})\}$ and $\{(u_{m_22'}^{Lx}, v_{m_22'}^{Lx})\}$ for x, $\{(u_{m_12'}^{Ly}, v_{m_12'}^{Ly})\}$ and $\{(u_{m_22'}^{Ly}, v_{m_22'}^{Ly})\}$ for y, and $\{(u_{m_12'}^{Lz}, v_{m_12'}^{Lz})\}$ and $\{(u_{m_22'}^{Lz}, v_{m_22'}^{Lz})\}$ for z; can be used to find the line intersections in Image-2' and hence the vanishing points in the projective Image-2':

$$\begin{bmatrix} u_{\infty 2'}^{Lx} \\ v_{\infty 2'}^{Lx} \end{bmatrix} = \text{Intersection of Lines } \{(u_{m_12'}^{Lx}, v_{m_12'}^{Lx})\} \text{ and } \{(u_{m_22'}^{Lx}, v_{m_22'}^{Lx})\} \quad (32)$$

$$\begin{bmatrix} u_{\infty 2'}^{Ly} \\ v_{\infty 2'}^{Ly} \end{bmatrix} = \text{Intersection of Lines } \{(u_{m_12'}^{Ly}, v_{m_12'}^{Ly})\} \text{ and } \{(u_{m_22'}^{Ly}, v_{m_22'}^{Ly})\}$$

$$\begin{bmatrix} u_{\infty 2'}^{Lz} \\ v_{\infty 2'}^{Lz} \end{bmatrix} = \text{Intersection of Lines } \{(u_{m_12'}^{Lz}, v_{m_12'}^{Lz})\} \text{ and } \{(u_{m_22'}^{Lz}, v_{m_22'}^{Lz})\}$$

The ideal un-rotated UWA camera position 1 (e.g. FIG. 5B) also has associated with it the same type projective camera, identified as n=1', with identical orientation and position. In the 3D frame of camera position-1', which is identical to the frame of position 1, the line coordinates are $\{(x_{m1'}^L, y_{m1'}^L, z_{m1'}^L)\}$. Under the transformation (28) between the two UWA cameras, which is the same transformation undergone by the projective cameras 1' and 2', the Frame-1' coordinates are mapped to the Image-2' coordinates according to (29):

$$u_{m2'}^L = -f_P \frac{R_{xx}x_{m1'}^L + R_{xy}y_{m1'}^L + R_{xz}z_{m1'}^L + x_s}{R_{zx}x_{m1'}^L + R_{zy}y_{m1'}^L + R_{zz}z_{m1'}^L + z_s} \quad (33)$$

$$v_{m2'}^L = -f_P \frac{R_{yx}x_{m1'}^L + R_{yy}y_{m1'}^L + R_{yz}z_{m1'}^L + y_s}{R_{zx}x_{m1'}^L + R_{zy}y_{m1'}^L + R_{zz}z_{m1'}^L + z_s}$$

Taking the infinite limit for lines parallel to the three axes gives the three vanishing points for Image-2' as in (8). Since the vanishing points are already known from (33), the final result is the same six equations relating the rotation matrix elements (9), re-written below, maintaining the projective camera index to explicitly show that the vanishing points are computed from the projective images not the original UWA images:

$$R_{zx} = \frac{-f_P}{u_{\infty 2'}^x} R_{xx}, \; R_{yx} = \frac{v_{\infty 2'}^x}{-f_P} R_{zx} = \frac{v_{\infty 2'}^x}{u_{\infty 2'}^x} R_{xx} \quad (34)$$

$$R_{zy} = \frac{-f_P}{v_{\infty 2'}^y} R_{yy}, \; R_{xy} = \frac{u_{\infty 2'}^y}{-f_P} R_{zy} = \frac{u_{\infty 2'}^y}{v_{\infty 2'}^y} R_{yy}$$

$$R_{xz} = \frac{u_{\infty 2'}^z}{-f_P} R_{zz}, \; R_{yz} = \frac{v_{\infty 2'}^z}{-f_P} R_{zz}$$

The same focal length $f_P$ should be used for computing the vanishing points. From here onwards, the derivation for the rotation matrix is identical to that of the projective camera. In particular, the rotation matrix is given by equations (16) to (20) or (24) to (26). The translation cannot be computed from vanishing points alone, and normally is not the issue when the projection source is in a fixed position.

Finally, once the rotation matrix associated with the capture device 14 is obtained, a correction transformation can be computed 180 to undo misorientation of the projection source 10. Given the rotation of the projector relative to camera is known, its' absolute (relative to the ideal) rotation can be calculated as follows:

$$R_{IP} = R_{IC} \times R_{CP} \quad (35)$$

where $R_{IC}$ is the camera rotation matrix, as computed; $R_{CP}$ represents the rotation matrix relating the projector to the camera; and $R_{IP}$ is the matrix representing rotation of the projector with respect to the ideal orientation. $R_{CP}$ may be an identity matrix, for instance if the capture device is integrated with the projection source. Furthermore, in analogy with what was demonstrated in Eqs. (27) and (28) regarding the camera displacement factor, the relative displacement of the projector from the camera does not affect $R_{CP}$.

A correction transformation 180 constructed upon the rotation matrix $R_{IP}$ can be applied to the output image in a forward direction to correct for the image distortions. Alternatively, an inverse transformation can be calculated and applied to the source or input image, such that the output image appears substantially undistorted. The latter would be preferred when the calibration is performed in real-time using a processing chip.

In one embodiment, orientation of the projection source changes as in time, requiring frequent calibration. The above procedure can be repeated as often and as fast as needed to dynamically compute a rotation matrix for varying rotational angles.

In one embodiment, the projection source is part of a car HUD assembly, where the image is formed on a virtual screen a few feet in front of the car's windshield. During the calibration process, the optical rays for both the projection source and the capture device pass through the windshield which is normally curved, adding extra distortions. The windshield curvature, as well as other distortions in the system that are optical in nature, are generally decoupled from the geometric (rotation) and fisheye distortions. That also applies to real viewing surface distortions, be it intrinsic curvatures or a specific geometry. Techniques taught for example in the U.S. Pat. No. 8,406,562 can be used, usually once, and the correction components associated with each of the above distortions may get concatenated with the geometric correction $R_{IP}$ as disclosed.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A test-pattern-free method to calibrate an image projector for rotational movements of the projector with respect to a reference frame having three perpendicular x, y, and z axes, wherein x and z axes are on a horizontal plane and z axis is along optical axis of the image projector, said method comprising:
    capturing at least one image of a scene by an Ultra Wide-Angle (UWA) lens camera that is attached to the image projector; and
    configuring at least one processing unit to:
    detect a plurality of structures in the at least one image that are presumed horizontal structures in the scene in the UWA lens space;
    identify at least two parallel lines from the plurality of horizontal structures along the x axis in the at least one image of the scene;
    obtain coordinates of a vanishing point corresponding to the at least two parallel lines, in the UWA lens space using UWA lens mapping transformation;
    obtain rotational angle of the image projector with respect to the x axis from the coordinates of the vanishing point; and
    construct and apply a correction transformation using the obtained rotational angle to compensate for horizontal pan of the image projector.

2. The calibration method of claim 1, wherein the at least one image processing unit is further configured to correct for rotational angle of the image projector with respect to the z axis by computing an angle between the at least two parallel lines, as corrected for the horizontal pan, and the horizon.

3. The calibration method of claim 1, wherein the vanishing point is at infinity and the at least one image processing unit is further configured to correct for rotational angle of the image projector with respect to the z axis by computing an angle between the at least two parallel lines and the horizon.

4. The method of claim 1, wherein spatial orientation of the image projector changes in time and the calibration is dynamically performed.

5. The method of claim 1, wherein the image projector is part of a Heads-Up-Display (HUD) assembly and image forms on a virtual viewing surface.

6. A test-pattern-free method to calibrate an image projector for rotational movements of the projector with respect to a reference frame having three perpendicular x, y, and z axes, wherein x and z axes are on a horizontal plane and z axis is along optical axis of the image projector, said method comprising:
    capturing at least one image of a scene by an Ultra Wide-Angle (UWA) lens camera that is attached to the image projector; and
    configuring at least one processing unit to:
    detect a plurality of structures in the at least one image that are presumed vertical structures in the scene in the UWA lens space;
    identify at least two parallel lines from the plurality of vertical structures along the y axis in the at least one image of the scene;
    obtain coordinates of a vanishing point corresponding to the at least two parallel lines, in the UWA lens space using UWA lens mapping transformation;
    obtain rotational angle of the image projector with respect to the y axis from the coordinates of the vanishing point; and
    construct and apply a correction transformation using the obtained rotational angle to compensate for vertical pan of the image projector.

7. The calibration method of claim 6, wherein the at least one image processing unit is further configured to correct for rotational angle of the image projector with respect to the z axis by computing an angle between the at least two parallel lines, as corrected for the vertical pan, and the horizon.

8. The calibration method of claim 6, wherein the vanishing point is at infinity and the at least one image processing unit is further configured to correct for rotational angle of the image projector with respect to the z axis by computing an angle between the at least two parallel lines and the horizon.

9. The method of claim 6, wherein spatial orientation of the image projector changes in time and the calibration is dynamically performed.

10. The method of claim 6, wherein the image projector is part of a Heads-Up-Display (HUD) assembly and image forms on a virtual viewing surface.

11. A test-pattern-free system that is used to calibrate an image projector for rotational movements of the projector with respect to a reference frame, the reference frame having three perpendicular x, y, and z axes, wherein x and z axes are on a horizontal plane and z axis is along optical axis of the image projector, said system comprising:
    an Ultra Wide-Angle (UWA) lens camera to capture at least one image of a scene, wherein the Ultra Wide-Angle (UWA) lens camera is attached to the image projector; and
    at least one processing unit that is configured to:
    detect a plurality of structures in the at least one image that are presumed horizontal structures in the scene in the UWA lens space;
    identify at least two parallel lines from the plurality of horizontal structures along the x axis in the at least one image of the scene;
    obtain coordinates of a vanishing point corresponding to the at least two parallel lines, in the UWA lens space using UWA lens mapping transformation;
    obtain rotational angle of the image projector with respect to the x axis from the coordinates of the vanishing point;
    construct a correction transformation using the obtained rotational angle; and
    apply the correction transformation to compensate for horizontal pan of the image projector.

12. The system of claim 11, wherein the at least one processing unit is further configured to compensate for rotation of the image projector with respect to the z axis by computing an angle between the at least two parallel lines, as corrected for the horizontal pan, and the horizon.

13. The system of claim 11, wherein the corresponding vanishing point is at infinity and the at least one processing unit is further configured to compensate for rotation of the image projector with respect to the z axis by computing an angle between the at least two parallel lines and the horizon.

14. The system of claim 11, wherein spatial orientation of the image projector changes in time and the system performs the calibration dynamically.

15. The system of claim 11, wherein the image projector is part of a Heads-Up-Display (HUD) assembly and image forms on a virtual viewing surface.

16. A test-pattern-free system that is used to calibrate an image projector for rotational movements of the projector with respect to a reference frame without using a test pattern, the reference frame having three perpendicular x, y, and z axes, wherein x and z axes are on a horizontal plane and z axis is along optical axis of the image projector, said system comprising:
    an Ultra Wide-Angle (UWA) lens camera to capture at least one image of a scene, wherein the Ultra Wide-Angle (UWA) lens camera is attached to the image projector; and
    at least one processing unit that is configured to:
    detect a plurality of structures in the at least one image that are presumed vertical structures in the scene in the UWA lens space;
    identify at least two parallel lines from the plurality of vertical structures along the y axis in the at least one image of the scene;
    obtain coordinates of a vanishing point corresponding to the at least two parallel lines, in the UWA lens space using UWA lens mapping transformation;
    obtain rotational angle of the image projector with respect to the y axis from the coordinates of the vanishing point;
    construct a correction transformation using the obtained rotational angle; and
    apply the correction transformation to compensate for vertical pan of the image projector.

17. The system of claim 16 wherein the at least one processing unit is further configured to compensate for rotation of the image projector with respect to the z axis by computing an angle between the at least two parallel lines, as corrected for the vertical pan, and the horizon.

18. The system of claim 16, wherein the corresponding vanishing point is at infinity and the at least one processing unit is further configured to compensate for rotation of the image projector with respect to the z axis by computing an angle between the at least two parallel lines and the horizon.

19. The system of claim 16, wherein spatial orientation of the image projector changes in time and the system performs the calibration dynamically.

20. The system of claim 16, wherein the image projector is part of a Heads-Up-Display (HUD) assembly and image forms on a virtual viewing surface.

* * * * *